United States Patent [19]

Hanashita et al.

[11] Patent Number: 5,308,696
[45] Date of Patent: May 3, 1994

[54] CARBON FIBER-REINFORCED CEMENT MATERIAL AND METHOD FOR PREPARING SAME

[75] Inventors: Kazuhiko Hanashita; Koji Sakata; Shigeru Kanamaru; Toshiyuki Nawa, all of Kitakyushu; Kozo Toyama, Chofu; Yoshikazu Takei, Chofu; Tatsuo Suenaga, Chofu; Yoshikazu Taniguchi, Chofu, all of Japan

[73] Assignees: Mitsui Mining Company; Limited and Kajima Corporation, both of Tokyo, Japan

[21] Appl. No.: 906,190

[22] Filed: Jun. 29, 1992

[30] Foreign Application Priority Data

Jun. 28, 1991 [JP] Japan .................................. 3-184093

[51] Int. Cl.⁵ .......................... C04B 19/04; B32B 19/00
[52] U.S. Cl. ....................................... 428/357; 428/364; 428/375; 428/408; 428/902; 106/654; 106/672; 106/686; 106/689; 106/703; 252/628; 264/228
[58] Field of Search ............... 106/654, 672, 686, 689, 106/703; 252/628; 428/364, 375, 404, 408, 357, 902; 264/228

[56] References Cited

U.S. PATENT DOCUMENTS 4,452,635  6/1984  Noshi et al. ............................ 106/74

Primary Examiner—Patrick J. Ryan
Assistant Examiner—Richard P. Weisberger
Attorney, Agent, or Firm—Millen, White, Zelano, & Branigan

[57] ABSTRACT

A method for preparing a carbon fiber-reinforced cement material is here disclosed which comprises the step of using, as a reinforcing material, a carbon fiber from which a gas has been removed by replacing the gas captured in the fiber with water. This method permits providing the carbon fiber-reinforced cement material having a large reinforcing effect by the fiber.

8 Claims, No Drawings

CARBON FIBER-REINFORCED CEMENT MATERIAL AND METHOD FOR PREPARING SAME

BACKGROUND OF THE INVENTION (i) Field of the Invention

The present invention relates to a carbon fiber-reinforced cement material containing carbon fiber as a reinforcing material and having a high reinforcing effect, and it also relates to a method for preparing the above-mentioned carbon fiber-reinforced cement material.

(ii) Description of the Prior Art

Cement materials such as mortar and concrete are inexpensive and excellent in durability, fire resistance and other physical properties such as compression strength and stiffness. Thus, they have been widely used as construction materials and building materials. In these cement materials, tensile strength and impact resistance are low in contrast to the compression strength, and an energy absorption ability is poor. Accordingly, the cement materials have the drawback that they are "brittle" from the viewpoint of physical properties. In addition, the cement materials do not have any conductivity, and so when they are used as floor materials, a special treatment such as an antistatic treatment is required on occasion. For the purpose of solving these problems, fiber-reinforced cement materials reinforced with various fibers have been often used. Above all, much attention is paid to fiber-reinforced cement materials containing a carbon fiber as a reinforcing material which are characterized by having good chemical stability typified by alkali resistance, good heat resistance, large strength and elasticity, high conductivity and light specific gravity.

However, in the cement material reinforced with a short carbon fiber, the tensile strength and bending strength of the cement material are not sufficiently improved in proportion to the tensile strength which the carbon fiber inherently has, and there is the problem that values of the strength widely scatter in a series of products or even in one product. The cause of these drawbacks can be considered to be as follows: In the short carbon fiber-reinforced cement material, the adhesion of a cement matrix to the carbon fiber is not sufficient, so that the reinforcing ability of the carbon fiber is not exerted. In consequence, the tensile strength and the bending strength of the fiber-reinforced cement material do not depend upon the strength of the carbon fiber for the reinforcement but the adhesion or fixation between the cement matrix and the carbon fiber.

As attempts to improve the fixation of the carbon fiber in the cement matrix, there have been suggested a method in which the carbon fiber is oxidized with an oxidizing agent such as oxygen or ozone to make the surface of the fiber hydrophilic (KOJIMA et al., Tanso, No. 131, pp 161, 1987) and another method in which a fine cement and a fine aggregate are used to heighten dispersibility (SHIRAKAWA et al., the 4th, Concrete Engineering Annual Lecture Meeting, Lecture Booklet, pp 153, 1982). However, these methods are not satisfactory from the viewpoints of the performance and the manufacturing cost of the carbon fiber-reinforced cement material. Thus, a simple method for preparing the carbon fiber-reinforced cement material is desired in which characteristics inherent in the carbon fiber are utilized and the dependence upon the carbon fiber in the strength is heightened.

The present invention has been made under such a situation, and a major object of the present invention is to provide a method for preparing a carbon fiber-reinforced cement material having an enhanced fiber reinforcement effect by a simple process.

SUMMARY OF THE INVENTION

The present invention which can accomplish the above-mentioned object is directed to a method for preparing a carbon fiber-reinforced cement material containing a carbon fiber as a reinforcing material, which method is characterized by comprising the steps of subjecting the carbon fiber to a water replacement treatment wherein an amount of the gas captured by the fiber is reduced by replacing the gas with water; and uniformly incorporating the treated carbon fiber into a cement matrix.

According to the method of the present invention, there can be solved problems in manufacturing a conventional carbon fiber-reinforced cement material, i.e., the fluctuation of strength and the drawback that a reinforcing effect by the fiber are not sufficiently improved in proportion to the strength which the carbon fiber inherently has, and the present invention permits easily manufacturing a carbon fiber-reinforced cement material having a high reinforcement efficiency without fluctuation of quality. The carbon fiber-reinforced cement material using the carbon fiber subjected to the water replacement treatment has an organization in which considerably fewer pores are present, and it is more excellent in physical properties such as bending strength and compression strength, as compared with a carbon fiber-reinforced cement in which the untreated carbon fiber is used. There is not known a technology by which the cement reinforcing effect of the carbon fiber can be brought out to such a high degree as in the present invention.

DETAILED DESCRIPTION AND THE PREFERRED EMBODIMENTS

In order to amply understand the technical significance of a water replacement treatment for a carbon fiber which is extremely characteristic in the present invention, the history to the present invention will be first described.

The present inventors have intensively researched a method for preparing a carbon fiber-reinforced cement material having a high reinforcing effect, and as a result, they have observed the following phenomena.

(1) In the cement material reinforced by adding and mixing a carbon fiber, the fluctuation of tensile strength, bending strength and compression strength are large. Although reinforced with the carbon fiber, the cement material sometimes has a lower strength than a cement material containing no carbon fiber, and articles made therefrom crack in extreme cases.

(2) The fluctuation of the strength is intimately concerned with the magnitude of the expansion (i.e., a bulk specific gravity of the carbon fiber-reinforced cement material) at the time of hardening, and in the hardened article in which the expansion has been observed at the hardening, the strength remarkably deteriorates.

(3) With regard to the cement material containing no carbon fiber, any expansion is not observed at the end of the hardening, but most of the cement materials containing the carbon fiber expand. In some cases, the expansion is as high as 10 to 15% in terms of a linear expansion coefficient.

(4) In the cement material in which the expansion has occurred at the time of the hardening, many spherical pores are observed.

(5) When immersed in water, the carbon fiber sinks immediately after the immersion, but in a certain case, even after a time as short as 2 to 3 minutes, air bubbles appear and adhere to the surface of the fiber, so that the carbon fiber floats. When the floating fiber is stirred in water, the air bubbles are separated therefrom and the fiber sinks again. This cycle of sinking and floating can be repeated 3 to 4 times during 2 or 3 days, though a time until the floatation becomes long.

(6) The gas released from the carbon fiber was collected by a water replacement method and then analyzed. As a result, most of the gas was air.

(7) For samples of the carbon fiber-reinforced cement material in which the large expansion and the low strength were observed and the other carbon fiber-reinforced cement material in which no expansion or the outstandingly less expansion and the high strength were observed, measurement was made. As a result, they were not different in true specific gravity and in the crystal morphology of hardened cements by an X-ray diffractometry.

The present inventors have further investigated such phenomenons, and they have found that when the carbon fiber is added to and mixed with the cement matrix to form the carbon fiber-reinforced cement material, the gas (mainly air) captured by the carbon fiber is released into the cement matrix at the time of kneading and hardening, so that the density of the hardened cement lowers and an air layer is formed between the carbon fiber and the cement matrix to deteriorate the adhesion between the carbon fiber and the cement matrix, which leads further to the deterioration of the carbon fiber-reinforced cement material. On the basis of this fact, the present inventors have researched a technique for removing the gas captured by the carbon fiber, and as a result, the present invention has been attained.

As described above, the present inventors have elucidated the intimate connection between the strength of the carbon fiber-reinforced cement material and the gas (most of the gas is air) present on the surface of the carbon fiber to be used, and they have developed an effective carbon fiber treatment technology based on the obtained knowledge, and finally, the present invention has been completed. Therefore, the technical significance of the present invention is extremely large. Now, the present invention will be described in detail.

In the present invention, PAN-based, pitch-based and other various organic material-based carbon fibers can be used as the reinforcing materials, but when the carbon fiber having a large gas adsorption ability is used, the particularly remarkable effect can be exerted. Above all, the carbon fiber which can be obtained by spinning a formaldehyde condensate of an aromatic sulfonic acid compound and then carbonizing it at a temperature of from 600° to 2000° C. is particularly preferable, because this kind of carbon fiber has a hydrophilic active group such as a sulfonic acid group and therefore it is excellent in affinity for the cement matrix. In addition, the carbon fiber having the hydrophilic active group permits efficiently carrying out the water replacement treatment, which is also preferable. Although the general physical properties of the carbon fiber largely depend upon a raw material, a carbonization temperature and the like, Table 1 exemplifies the physical properties of the carbon fiber materials.

TABLE 1

| Kind of Carbon Fiber | Pitch-Based | NSF-Based | PAN-Based |
|---|---|---|---|
| Contact Angle to Water (°) | 72 | 55 | 73 |
| Saturated Water Adsorption Content (wt %) | 10 | 12 | 0.1 |
| Saturated Carbon Dioxide Gas Adsorption Content (ml/g) | 63 | 74 | 0.2 |
| Surface Area (m²/g) | 188 | 220 | 0.5 |

Notes
1) NSF-Based: An aromatic sulfonic acid formaline condensate-based carbon fiber.
2) Surface Area: It was measured by a carbon dioxide gas adsorption method.

The so-called GP carbon fiber which can be used to reinforce the usual cement material has a surface area of from 3 to 250 m²/g and a $CO_2$ adsorption of about 1.0 to 100 ml/g as measured by a carbon dioxide gas adsorption method, which means that the GP carbon fiber can capture a fairly large amount of the gas. For example, when the carbon fiber (a diameter of from over ten $\mu$m to below one hundred $\mu$m) obtained by spinning a formaldehyde condensate of an aromatic sulfonic acid compound, carbonizing, and then cutting into a length of 3 mm is immersed in water, the carbon fiber sinks immediately after the immersion. However, in a certain case, after a time as short as 2 to 3 minutes, air bubbles appear and adhere to the surface of the fiber with the result that the carbon fiber floats. When the floating fiber is stirred in water, the air bubbles are separated therefrom and the fiber sinks again. This cycle of sinking and floating can be repeated 3 to 4 times. Here, assuming that the true specific gravity of the carbon fiber is 1.60 and the cycle number of sinking and floating is 4, the formula $1.6 / (1+v) < 1$ can be set up wherein v (ml) is a gas volume necessary to float 1.6 g of the carbon fiber, and hence $v > 0.6$. Therefore, $V_1 > 4 \times v > 4 \times 0.6 = 2.4$ (ml) wherein $V_1$ (ml) is a gas volume generated from 1.6 g of the carbon fiber. In consequence, the gas (mainly air) is generated in an amount of about 2.4 ml per 1.6 g of the carbon fiber by the water replacement. Assuming that all of the released gas are captured in the carbon fiber-reinforced cement material, a volume percent P of the gas released from the carbon fiber (blend ratio=2 vol %) in the carbon fiber-reinforced cement material is $P=2$ (vol %)$\times 2.4$ (ml/ml)$=4.8$ (vol %). If air captured at the time of the kneading is taken into consideration, it is possible that the porosity of the carbon fiber-reinforced cement material is in excess of 10%. In fact, in experiments by the present inventors, it was observed that some examples of the carbon fiber-reinforced cement materials having the low strength had a porosity of more than 10% (an image analysis method, see examples).

The largest feature of the present invention is that prior to the kneading with the cement matrix, the carbon fiber is subjected to the water replacement treatment to replace the captured gas with water, thereby removing the gas. The gas captured by the carbon fiber means the gas molecules ($N_2$, $O_2$ and the like) adsorbed on the surface of the carbon fiber and the gas confined in the surface of the carbon fiber inclusive of the gas and the like present in the pores. Under usual conditions, the gas is air. In this connection, as a means for removing the gas, vacuum deaeration can be conceived, but in this means, a large-scale apparatus is required, and prior to the kneading, the carbon fiber is exposed to the atmosphere and easily capture air again. Therefore, it is effective that the captured gas is replaced with a stable material which does not adversely affect the cement material, so as to prevent the gas from being captured again. In order to accomplish the object of the present invention, it is most preferable to replace the gas with water which is an essential substance in preparing cement materials.

Next, as the water replacement treatment, there can be employed a method in which the carbon fiber is allowed to stand in the atmosphere for a long period of time, a method in which the carbon fiber is treated with high-pressure water vapor, or a method in which the carbon fiber is immersed in water. In the method in which the carbon fiber is allowed to stand in the atmosphere for a long time, if the completely dried carbon fiber is used, it takes 5 days under circumstances of a humidity of 50% and an atmospheric temperature of 25° C., or 1 or more days under circumstances of a humidity of 80% and an atmospheric temperature of 20° C. until the fiber absorbs water up to an equivalent adsorption moisture content. Furthermore, in the case of the high-pressure water vapor treatment (100°-180° C., about 0.1 to 1 MPa), the treatment can be achieved in a short period of time with a high efficiency in contrast to the natural moisture adsorption method, and a sufficient effect can be additionally obtained.

In the case of the water immersion method, operation is easy and effect is also secure, and so this method is particularly suitable. With regard to the carbon fiber-reinforced cement material prepared by using the carbon fiber obtained by the water immersion treatment which comprises immersing the carbon fiber in water and then allowing it to stand for a certain time, bulk specific gravity, compression strength and bending strength of the resultant cement material increase, as the immersion time is prolonged. The immersion of 1 or more days leads to the sufficiently practical strength, but in order to obtain the secure strength, the immersion period is preferably 3 days or more. When the immersion days are prolonged to 14 days or 28 days, the strength can be further improved, but in general, the immersion of the carbon fiber for 3 to 7 days is enough to obtain the sufficiently secure strength. Even after the air bubbles have not been observed by the eye in water any more, the strength can be heighten by the further continuous immersion, but this phenomenon can be presumed to be due to the fact that a small amount of the gas which cannot be clearly perceived is still continuously replaced.

As techniques for shortening the treatment time for the replacement of the gas adsorbed on the carbon fiber with water or techniques for simplifying the process, there are a method in which water in which the carbon fiber is now being immersed is heated (80° to 100° C.) or ultrasonic wave (10 to 100 W/l) is applied to the water; a method in which the treatment is made in an autoclave; a method in which the carbon fiber still in a high-temperature state (approximately 80° to 300° C.) at the outlet of a carbonizing furnace in a carbon fiber manufacturing process is cooled with water vapor or water; and a method in which the carbon fiber is heated under reduced pressure (about $1 \times 10^3$ to $1 \times 10^5$ Pa, 20° to 100° C.) to remove the gas therefrom, and water vapor or water is then introduced into the system to get the carbon fiber adsorbing water. In replacing the gas with water, there can be used a surface active agent particularly such as naphthalene sulfonate formaldehyde condensate or an Na salt thereof, or lignin sulfonate or an Na salt thereof which is used as a cement dehydrating agent. In addition, a pH of water for the immersion may be alkalized (pH 8 to 10) to accelerate a replacement rate.

In the present invention, the cement matrix means a matrix of a cement system, and it includes cement, mortar and concrete which may contain various additives such as an AE agent and the dehydrating agent and which may be before and after curing.

No particular restriction is put on the cement which is used in the carbon fiber-reinforced cement material of the present invention, but the cement comprising fine particles is suitable. Typically, it is preferable to use a rapid-hardening cement or a super rapid-hardening cement. In compliance with a use purpose, a cement having a low shrinkage ratio can be also employed. In the case that an aggregate is used, a fine grain aggregate such as fly ash, silica fume or fine silica sand is preferable so as to obtain a good adhesion between the cement matrix and the fiber. In addition, for the purpose of lightening the weight, an inorganic hollow material such as silas balloon may be used.

The carbon fiber to be used may be a short fiber or a long fiber. In the case that the short fiber is used, a milled fiber having a length of less than 0.5 mm can be used if necessary. If the length of the carbon fiber is from 0.5 to 20 mm, particularly from 1.0 to 6.0 mm, the carbon fiber having such a length is excellent in dispersibility and fluidity and conveniently has a large effect as the reinforcing material. In order to secure the reinforcing effect, the amount of the carbon fiber to be blended is in the range of from 1 to 20% by volume in terms of the ratio (converted to a true specific volume) of the volume of the carbon fiber to the total volume of the cement matrix containing the carbon fiber, and in practice, the amount of the carbon fiber is preferably from about 1 to 10% by volume. When this amount is in excess of 10% by volume, the dispersibility of the fiber deteriorates, and the reinforcing effect cannot be increased any further.

The carbon fiber whose length is suitably regulated and in which the captured gas is replaced with water by the above-mentioned procedures is blended and kneaded with and dispersed in a cement paste optionally containing additives such as an aggregate and a fluidizing agent. Usually, in order to uniformly disperse the short carbon fiber in the cement matrix, it is preferable to use a mixer such as an omnimixer having a strong kneading effect. However, in the case that a carbon fiber having a good dispersibility is used such as the carbon fiber made from a formaldehyde condensate of an aromatic sulfonic acid compound as a raw material, a usual mixer such as a mixer for force-stirring or an inclined barrel type mixer is acceptable.

For the unhardened cement matrix which has already been kneaded, fluidity is suitably adjusted in compliance with a use purpose prior to the use. That is, in order to deposit the cement matrix in which the carbon fiber is dispersed, a flow value of from 15 to 22 cm is necessary. In the case that molding is made by press molding or extrusion molding, a lower flow value is also acceptable. In the kneading step, an antifoamer can be used to prevent air from being captured in the carbon fiber at the time of the kneading, or a vibrator or the like can be effectively used to forcedly defoam. The cement matrix containing the dispersed carbon fiber can be hardened by an optional cure such as an autoclave cure, vapor cure, water-in-cure or gas-in-cure to obtain the carbon fiber-reinforced cement material having a large reinforcing effect by the carbon fiber.

In the case that the reinforcement is carried out by the use of the long carbon fiber, the sliver or the tow of the carbon fiber is used as it is or in the form of a suitably knitted cloth, rod, net or the like. The gas captured in the carbon fiber is replaced with water by the water vapor treatment or the water immersion treatment, and the carbon fiber is then put on required positions in a mold. Afterward, the cement matrix is poured thereinto and then hardened by an optional cure process.

According to the method of the present invention, the carbon fiber-reinforced cement material having a good adhesion between the carbon fiber and the cement matrix, a large fiber reinforcing effect and a high strength can be prepared by a simple process without fluctuation of quality.

One example of physical properties which the obtained carbon fiber-reinforced cement material has will be shown as follows.

| Carbon fiber content: | 1 to 20% by volume |
|---|---|
| Bulk specific gravity: | 0.9 to 2.5 |
| Porosity: | 1 to 15% |
| Bending strength: | 6.8 to 29.4 MPa |
| Compression strength: | 19 to 98 MPa |

The above-mentioned physical properties are values which were given in accordance with measurement procedures described in the following examples. In this connection, the above-mentioned physical properties also depend upon the physical properties of the cement matrix itself. Therefore, they do not intend to restrict the scope of the present invention but only typical and exemplary values.

Now, the method of the present invention will be described in detail in reference to examples.

In the undermentioned examples, the respective physical properties were measured by the following procedures.

Bulk specific gravity: A value obtained by dividing the weight of each sample by its volume.

Porosity: A value obtained by measuring the polished surface of each sample by means of an image analysis process.

| Testing machine: | Nireco, Ruzex III |
|---|---|
| Bending strength: | |
| Testing machine: | Shimazu Autograph AG-10TD |
| Loading: | three-point bending, fulcrum R 15 mm |
| Crosshead speed: | 0.5 mm/minute |
| Span: | 100 mm |
| Compression strength: | |
| Testing machine: | Maekawa testing machine |
| Test mold: | 40 × 40 × 40 mm |

Expansion coefficient: A glass tube was packed with unhardened mortar of each sample, and a linear expansion coefficient was measured at the time of the hardening.

EXAMPLE 1

Preparation of Samples

A commercially available pitch-based short carbon fiber having an average fiber length of 3 mm (fiber length =1 to 6 mm), an average strength of 588 MPa and an average elastic modulus of 29 GPa was treated under the following conditions to replace a gas captured in the fiber with water, thereby preparing samples.

In the first place, an untreated carbon fiber named a sample Ap ("P" stands for pitch-based) was allowed to stand at 20° C. at a humidity of 80% for 30 hours, and at this point, an equilibrium adsorption water content was reached. The carbon fiber in which 8% by weight of water was adsorbed was named a sample Bp. Four parts by weight of water were added to 6 parts by weight of the sample Ap, and the mixture was then allowed to stand hermetically at 20° C. for 3 days in a plastic bag, thereby forming a sample named a sample Cp. One part by weight of the sample Ap was immersed in 20 parts by weight of water and then allowed to stand at 20° C. for 3 days, 7 days, 14 days and 28 days, followed by draining, to prepare samples Dp, Ep, Fp and Gp, respectively.

Preparation of Carbon Fiber-Reinforced Cement Material

Silica sand No. 8 as an aggregate and a naphthalene sulfonate formaldehyde condensate system dehydrating agent were added to a rapid-hardening Portland cement, the amount of the dehydrating agent being 2% by weight with respect to the cement, and they were then blended under conditions of W/C=1.3 and S/C=0.8 (W and C stand for water and cement, respectively. S stands for sand, i.e., aggregate). The above-mentioned carbon fiber samples Ap to Gp were each blended with the cement mixture so that a carbon fiber content might be 2% by volume, and each blend was then mixed for 5 minutes by an omnimixer. The thus obtained carbon fiber blend mortar was molded to a sample of 4×4×16 cm. Afterward, each sample was hardened under an atmosphere at 20° C. at a relative humidity of 60%, and it was then cured at 150° C. for 10 hours in an autoclave to obtain a carbon fiber-reinforced cement material. For each sample, an expansion coefficient at the time of hardening, and bulk specific gravity, bending strength and compression strength at an age of 3 days were measured, and the results are set forth in Table 2. According to the results in Table 2, the expansion of the mortar at the hardening could be prevented by subjecting the carbon fiber to the water replacement treatment, so that the carbon fiber-reinforced cement material having the high strength could be obtained. In addition, as the degree of the water replacement treatment was enhanced, the improvement of the strength could be observed without changing the expansion coefficient.

TABLE 2

| Sample Name | Conditions | Expansion Coefficient (%) | Bulk Specific Gravity | Bending Strength (MPa) | Compression Strength (MPa) |
|---|---|---|---|---|---|
| Ap | Untreated | 10.0 | 1.01 | 5.69 | 10.8 |
| Bp | Equilibrium Water Content | 0.0 | 1.07 | 7.06 | 11.4 |
| Cp | Addition of water and hermetic | 0.0 | 1.08 | 7.55 | |

TABLE 2-continued

| Sample Name | Conditions | Expansion Coefficient (%) | Bulk Specific Gravity | Bending Strength (MPa) | Compression Strength (MPa) |
| --- | --- | --- | --- | --- | --- |
| | standing for 3 days | | | | |
| Dp | Immersion for 3 days | 0.0 | 1.08 | 7.84 | 14.7 |
| Ep | Immersion for 7 days | 0.0 | 1.08 | 8.82 | 15.7 |
| Fp | Immersion for 14 days | 0.0 | 1.08 | 9.12 | |
| Gp | Immersion for 28 days | 0.0 | 1.09 | 9.22 | |

EXAMPLE 2

Preparation of Samples

A carbon fiber having an average strength of 784 MPa and an average elastic modulus of 31.4 GPa which had been obtained from an ammonium salt of a β-naphthalene sulfonate formaldehyde condensate as a raw material was chopped into an average fiber length of 3 mm (fiber length = 2.9 to 3.1 mm) and then treated under the following conditions to replace a gas captured in the fiber with water, thereby preparing samples.

In the first place, the just made carbon fiber was stored hermetically at 20° C. in a plastic bag so as not to absorb moisture, and the thus stored carbon fiber was named a sample Hn ("n" stands for β-naphthalene sulfonate formaldehyde condensate). Furthermore, a sample In was prepared by immersing the carbon fiber in water in an amount 20 times as much as that of the carbon fiber, and then allowing it to stand at 20° C. for 28 days. A sample Jn was prepared by immersing the carbon fiber in water in an amount 20 times as much as that of the carbon fiber, and then subjecting it to an ultrasonic wave treatment (40 KHz, 65 W/l, for 30 minutes). A sample Kn was prepared by immersing the carbon fiber in water in an amount 20 times as much as that of the carbon fiber, adding a cement dehydrating agent made of naphthalene sulfonate formaldehyde condensate in an amount of 0.1% by weight with respect to the carbon fiber, and then allowing it to stand at 20° C. for 7 days. And a sample Ln was prepared by treating the carbon fiber with water vapor having a temperature of 180° C. and a pressure of 1 MPa for 2 hours, and then cooling it to room temperature in a water vapor saturated atmosphere.

Preparation of Carbon Fiber-Reinforced Cement Material

Silica sand No. 8 as an aggregate and a naphthalene sulfonate formaldehyde condensate system dehydrating agent were added to a rapid-hardening Portland cement, the amount of the dehydrating agent being 2% by weight to the cement, and they were then blended under conditions of W/C=0.5 and S/C=0.2. The above-mentioned carbon fiber samples Hn to Ln were each blended with the cement mixture so that a carbon fiber content might be 2% by volume, and each blend was mixed for 5 minutes by a mortar mixer. The thus obtained carbon fiber blend mortar was molded to a sample of 4×4×16 cm. Afterward, each sample was hardened under an atmosphere at 20° C. at a relative humidity of 60%, and it was then cured for 28 days to obtain a carbon fiber-reinforced cement material. For each sample, an expansion coefficient at the time of the hardening, and bulk specific gravity, bending strength and compression strength at an age of 28 days were measured, and the results are set forth in Table 3. According to the results in Table 3, it is apparent that the expansion of the mortar at the time of the hardening could be prevented by subjecting the carbon fiber to the water replacement treatment, so that the carbon fiber-reinforced cement material having the high strength could be obtained. In addition, it is apparent that the ultrasonic wave treatment, the employment of the cement dehydrating agent or the treatment with pressurized water vapor permitted remarkably shortening the time necessary for the water replacement in contrast to the case where the replacement of the gas with water was only carried out by immersion.

TABLE 3

| | (n: β-naphthalenesulfonic acid formalin condensate) | | | | |
| --- | --- | --- | --- | --- | --- |
| Sample Name | Conditions | Expansion Coefficient (%) | Bulk Specific Gravity | Bending Strength (MPa) | Compression Strength (MPa) |
| Hn | Prevention of moisture absorption | 15.0 | 1.33 | 8.13 | 32.7 |
| In | Immersion for 28 days | 0.0 | 1.60 | 13.5 | 47.1 |
| Jn | Immersion + ultrasonic wave | 0.0 | 1.59 | 12.7 | 45.7 |
| Kn | Immersion + dehydrating agent | 0.0 | 1.60 | 12.9 | 47.4 |
| Ln | High-pressure vapor | 0.0 | 1.60 | 13.3 | 48.2 |

EXAMPLE 3

Preparation of Samples

A commercially available pitch-based carbon fiber used in Example 1 and a carbon fiber obtained from an ammonium salt of a β-naphthalene sulfonate formaldehyde condensate as a raw material used in Example 2 (the average fiber length of both the carbon fibers=3 mm) were dried at 110° C. in a drying machine, and the thus dried carbon fibers were named Mp and Np, respectively. Afterward, 0.2 part by weight of water was added to 1 part by weight of each sample and then allowed to hermetically stand a 20° C. for 3 days in a plastic bag, thereby forming samples named samples Pp and Qn.

Preparation of Carbon Fiber-Reinforced Cement Material

Silica sand No. 8 as an aggregate was added to a rapid-hardening Portland cement, and an antifoamer was further added thereto in an amount of 3% with respect to the cement. Afterward, they were then blended under conditions of W/C=0.8 and S/C=0.8. The above-mentioned carbon fiber samples Mp to Qn were each blended with the cement mixture so that a carbon fiber content might be 2% by volume, and each blend was mixed for 5 minutes by an omnimixer. Each of the commercially available pitch system carbon fiber samples Mp and Pp was not sufficiently dispersed owing to the formation of stringy balls during mixing, and therefore 0.5% by weight of methyl cellulose was further added to the cement and the sample was then mixed and dispersed by the omnimixer again. The thus obtained carbon fiber blend mortar was molded to a sample of 4×4×16 cm, allowed to stand overnight, and then treated at 180° C. for 4 hours in an autoclave to obtain a carbon fiber-reinforced cement material. For the thus obtained samples and a sample for comparison not containing any carbon fiber which had been treated in the same manner, and an expansion coefficient at the time of hardening, bulk specific gravity, porosity, bending strength and compression strength after the autoclave treatment were measured, and the results are set forth in Table 4. According to the results in Table 4, it is apparent that the expansion of the mortar at the mortar hardening could be prevented by subjecting the carbon fiber to the water replacement treatment, so that the carbon fiber-reinforced cement material having the high strength could be obtained. In the case of the cement material reinforced with the carbon fiber which was not subjected to the water replacement treatment, many large pores were present, but in the cement material reinforced with the carbon fiber which was subjected to the water replacement treatment, less pores were present and its porosity was substantially equal to that of the cement material containing no carbon fiber. Furthermore, the carbon fiber obtained from an aromatic sulfonic acid formaldehyde condensate as a raw material had a larger effect of the water replacement treatment as compared with the pitch system carbon fiber. Incidentally, in the porosity, there were not contained spaces between the fiber and the cement matrix.

TABLE 5

| Pore Diameter (mm) | Pore Volume (%) | | |
|---|---|---|---|
| | No Carbon Fiber | Sample Nn | Sample Qn |
| 0.065–0.195 | 0.44 | 0.60 | 0.59 |
| 0.195–0.325 | 0.60 | 4.46 | 0.79 |
| 0.325–0.454 | 0.38 | 3.09 | 0.35 |
| 0.454–0.584 | 0.27 | 0.84 | 0.13 |
| 0.584–0.714 | 0.30 | 0.33 | 0.12 |
| 0.714–0.844 | 0.00 | 0.08 | 0.00 |
| 0.844–0.974 | 0.00 | 0.08 | 0.06 |
| 0.974–1.104 | 0.00 | 0.10 | 0.09 |
| 1.104–1.233 | 0.30 | 0.15 | 0.21 |
| 1.233–1.363 | 0.00 | 0.18 | 0.26 |
| 1.363–1.493 | 0.00 | 0.00 | 0.30 |
| 1.493–1.623 | 0.00 | 0.00 | 0.00 |
| 1.623–1.752 | 0.11 | 0.00 | 0.00 |
| 1.752–1.883 | 0.00 | 0.00 | 0.00 |
| 1.883–2.013 | 0.00 | 0.00 | 0.00 |
| 2.013–2.142 | 0.00 | 0.00 | 0.00 |
| 2.142–2.272 | 0.00 | 0.52 | 0.00 |
| 2.272–2.402 | 0.00 | 0.00 | 0.00 |
| 2.402 or more | 0.00 | 0.00 | 0.00 |
| Total Pore Volume | 2.40 | 10.43 | 2.90 |

What is claimed is:

1. A method for preparing a carbon fiber-reinforced cement material containing a carbon fiber as a reinforcing material, which is characterized by comprising the steps of; subjecting the carbon fiber to a water replacement treatment wherein an amount of the gas captured by the fiber is reduced by replacing the gas with water; and uniformly incorporating the treated carbon fiber into a cement matrix.

2. A method for preparing a carbon fiber-reinforced cement material according to claim 1, wherein the water replacement treatment comprises any one of the following processes: (a) a process in which the carbon fiber is allowed to stand in the atmosphere for a long time; (b) a process in which the carbon fiber is treated with high-pressure water vapor; and (c) a process in

TABLE 4

| Sample Name | Conditions | Expansion Coefficient (%) | Bulk Specific Gravity | Porosity (%) | Bending Strength (MPa) | Compression Strength (MPa) |
|---|---|---|---|---|---|---|
| Mp | Drying | 8.0 | 1.62 | 6.7 | 11.0 | 33.3 |
| Nn | Drying | 13.0 | 1.58 | 10.4 | 8.23 | 31.9 |
| Pp | Addition of water and hermetic standing for 3 days | 0.0 | 1.81 | 3.5 | 13.0 | 61.2 |
| Qn | Addition of water and hermetic standing for 3 days | 0.0 | 1.83 | 2.9 | 16.0 | 67.3 |
| | No additives | 0.0 | 1.83 | 2.4 | 7.06 | 66.1 |

Furthermore, for the materials obtained by the use of the samples Nn and Qn as well as the materials containing no carbon fiber, pore volume and pore distribution were measured by an image analysis process, and the results are set forth in Table 5. It is apparent from the results in Table 5 that in the carbon fiber-reinforced cement materials made from the dried carbon fiber Nn, a large amount of the pores were contained, but in the cement materials made from the samples Qn which underwent the water replacement treatment, the pore volume was extremely small.

Although the invention has been described with preferred embodiments, it is to be understood that variations and modifications may resorted to as will be apparent to those skilled in the art. Such variations and modifications are to be considered within the purview and the scope of the claims appended hereto.

which the carbon fiber is treated by immersing it in water.

3. A method for preparing a carbon fiber-reinforced cement material according to claim 2, wherein the process in which the carbon fiber is allowed to stand in the atmosphere for a long time is carried out so that the carbon fiber absorbs moisture to an equilibrium moisture content.

4. A method for preparing a carbon fiber-reinforced cement material according to claim 2, wherein the process in which the carbon fiber is treated with high-pressure water vapor is carried out at 100° to 180° C. under 0.1 to 1 MPa.

5. A method for preparing a carbon fiber-reinforced cement material according to claim 2, wherein the process in which the carbon fiber is treated by immersing it in water is carried out for a period of 1 to 28 days.

6. A method for preparing a carbon fiber-reinforced cement material according to claim 1, wherein the carbon fiber is a short fiber, and the amount of the carbon fiber is in the range of from 1 to 20% by volume in terms of a volume ratio (converted to a true specific volume) of the carbon fiber with respect to the total volume of the cement matrix containing the carbon fiber.

7. A method for preparing a carbon fiber-reinforced cement material according to claim 1, wherein the carbon fiber is a carbon fiber made from a formaldehyde condensate of an aromatic sulfonic acid compound as a raw material.

8. A cement material obtained by the method for preparing the carbon fiber-reinforced cement material in claim 1 and characterized by the following physical properties:

| | |
|---|---|
| (1) carbon fiber content: | 1 to 20% by volume |
| (2) bulk specific gravity: | 0.9 to 2.5 |
| (3) porosity: | 1 to 15% |
| (4) bending strength: | 6.8 to 29.4 MPa, and |
| (5) compression strength: | 19 to 98 MPa. |

* * * * *